Jan. 2, 1940. A. N. SPÁNEL 2,185,527
RUFFLED GARMENT AND THE LIKE
Filed Jan. 21, 1937 5 Sheets-Sheet 2
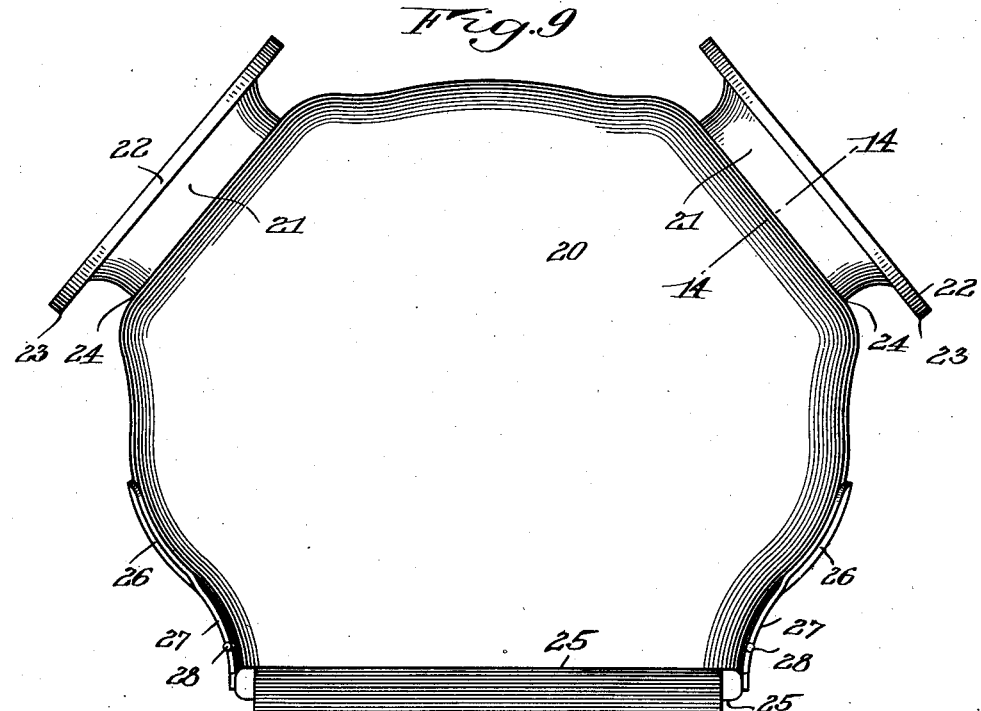
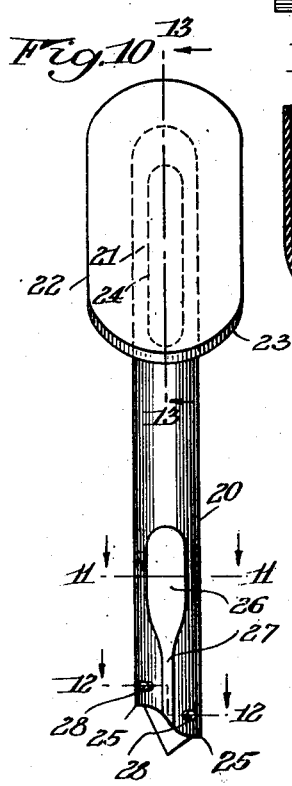
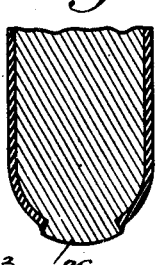
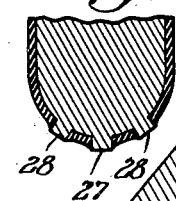
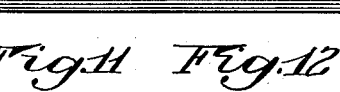
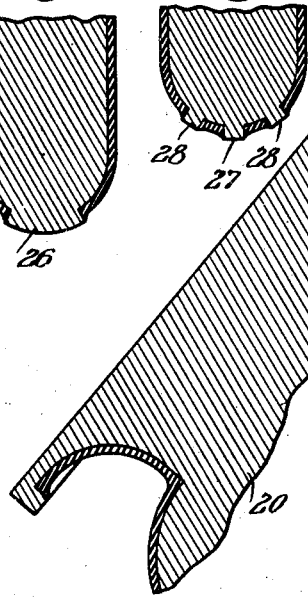
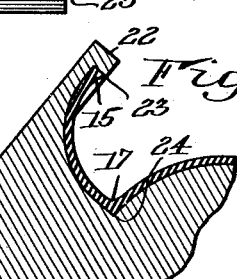
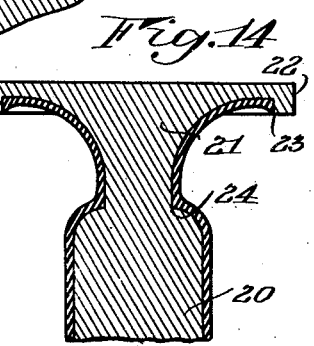
INVENTOR.
Abraham N. Spanel
BY D. Clyde Jones
his ATTORNEY.

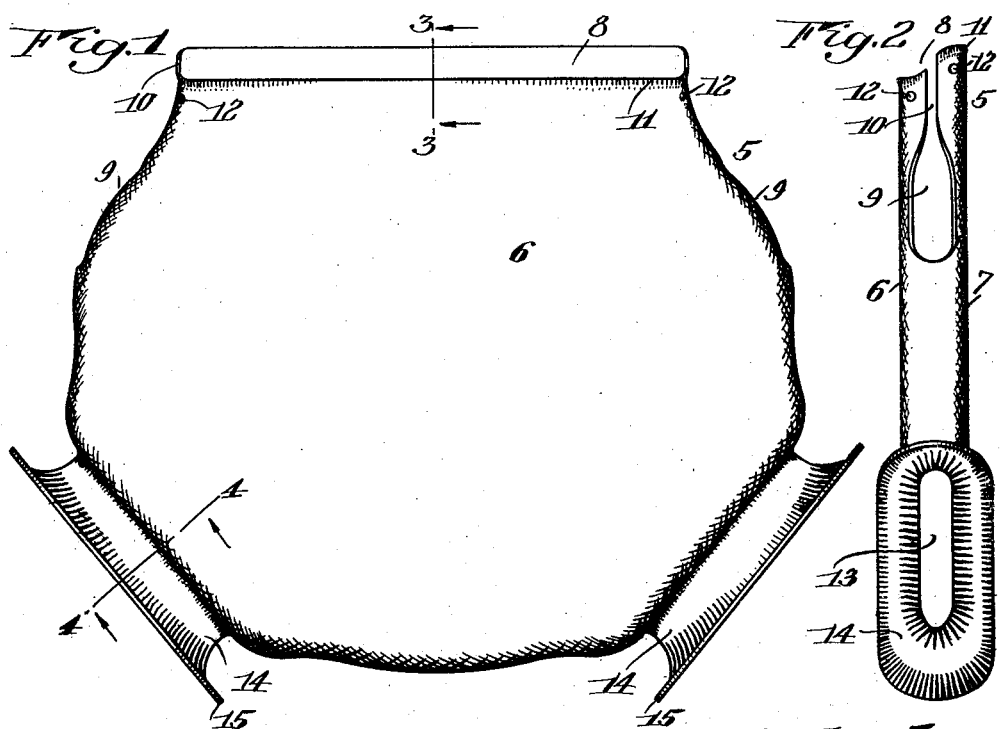
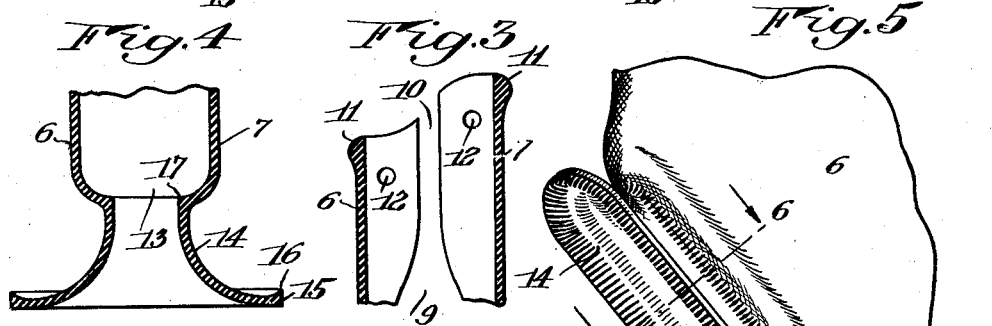
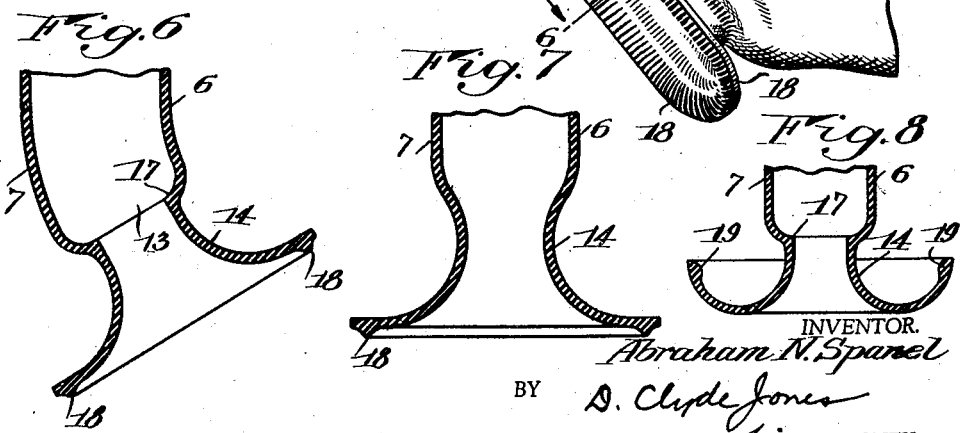

Jan. 2, 1940.  A. N. SPÁNEL  2,185,527
RUFFLED GARMENT AND THE LIKE
Filed Jan. 21, 1937   5 Sheets-Sheet 3
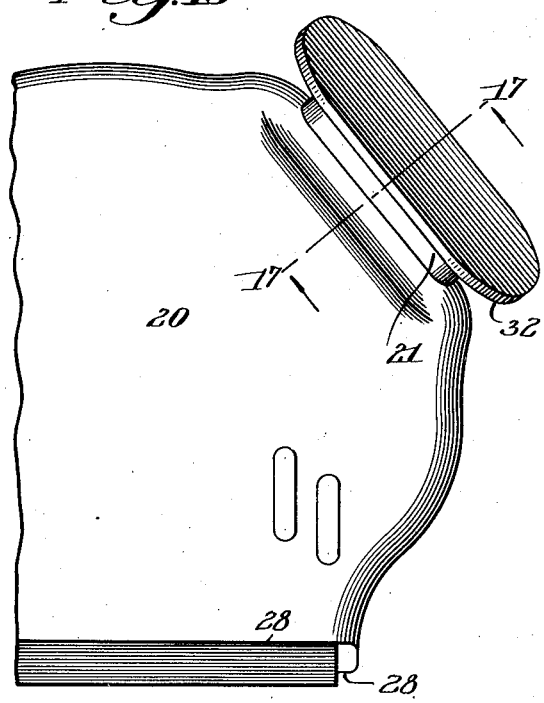
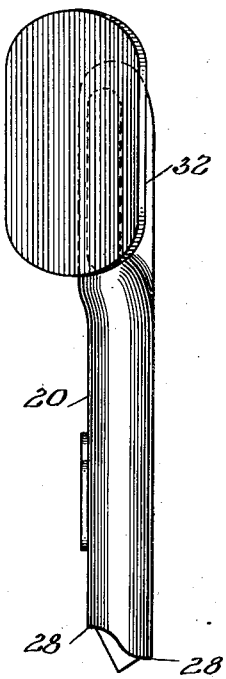
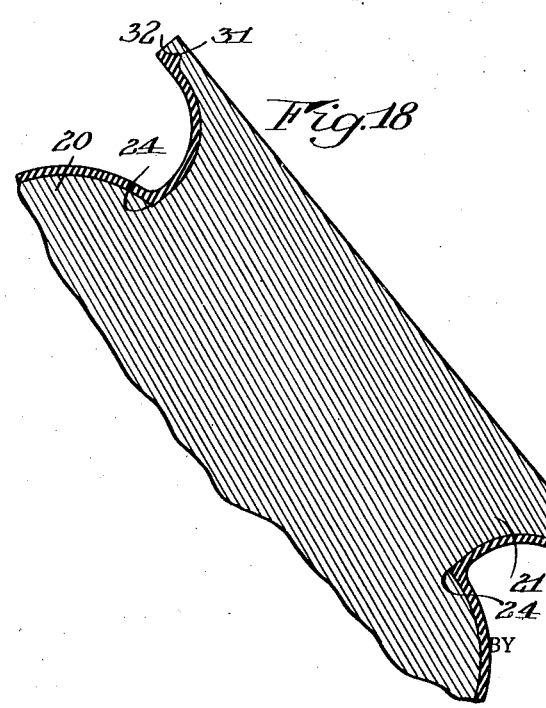
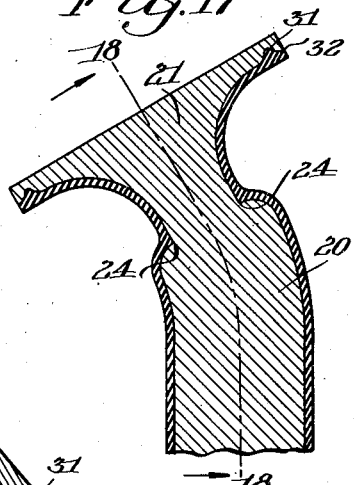
INVENTOR.
Abraham N. Spanel
D. Clyde Jones
his ATTORNEY.

Jan. 2, 1940.     A. N. SPÁNEL     2,185,527
RUFFLED GARMENT AND THE LIKE
Filed Jan. 21, 1937     5 Sheets-Sheet 4
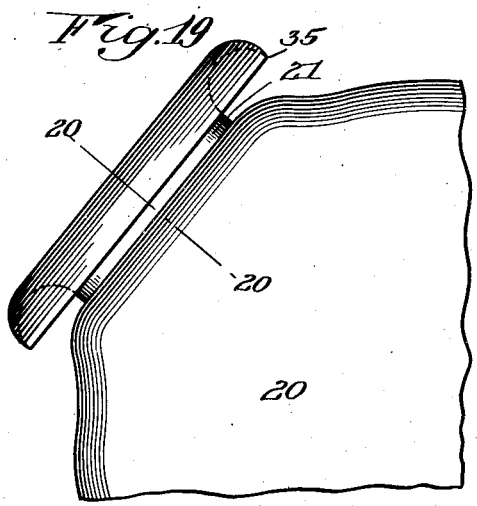
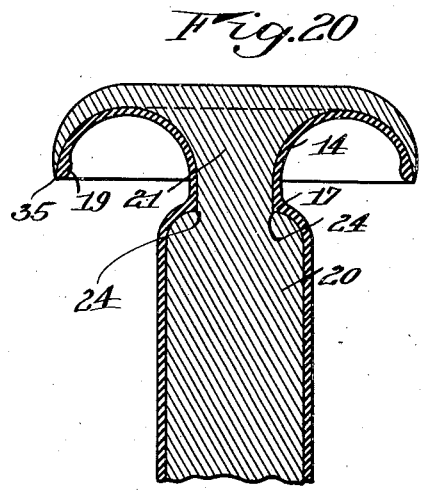
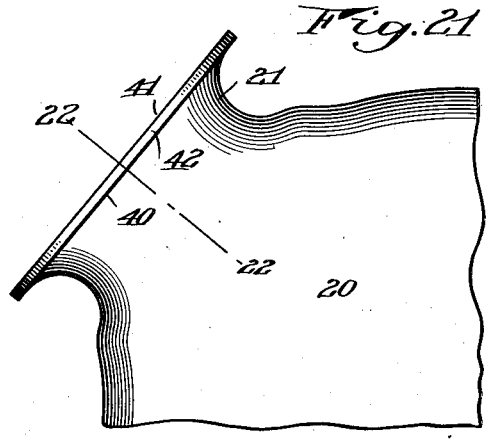
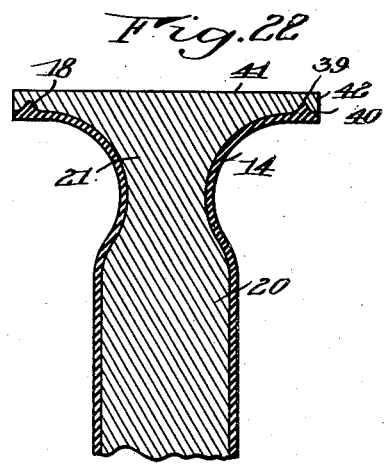
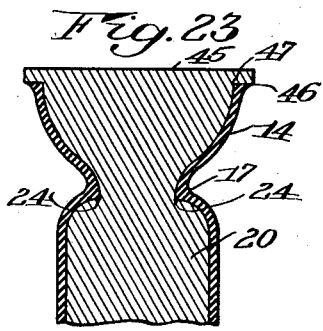
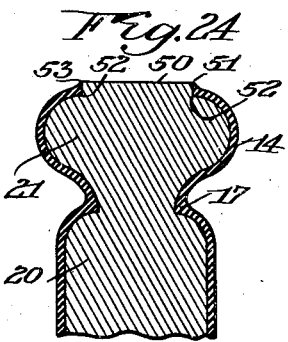
INVENTOR.
Abraham N. Spanel
BY D. Clyde Jones
his ATTORNEY.

Jan. 2, 1940.   A. N. SPÁNEL   2,185,527
RUFFLED GARMENT AND THE LIKE
Filed Jan. 21, 1937   5 Sheets-Sheet 5
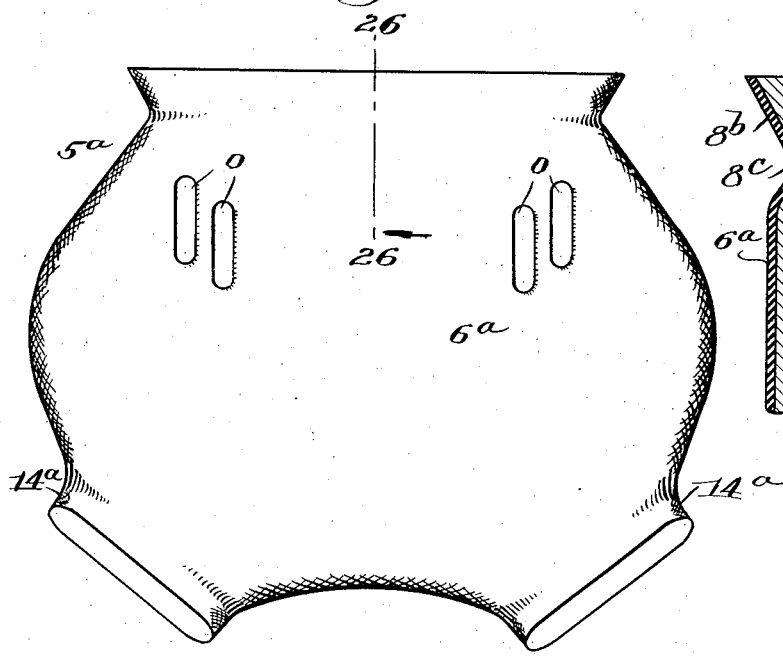
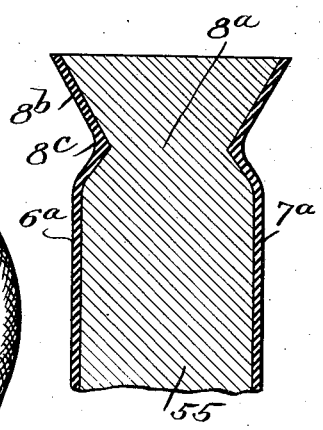
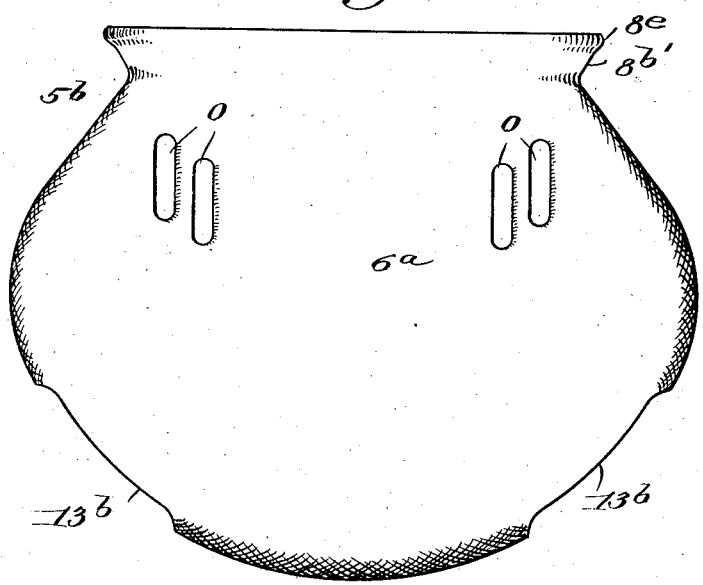
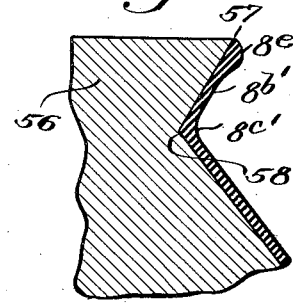
INVENTOR.
Abraham N. Spánel
BY D. Clyde Jones
his ATTORNEY.

Patented Jan. 2, 1940

2,185,527

UNITED STATES PATENT OFFICE 2,185,527

RUFFLED GARMENT AND THE LIKE

Abraham N. Spánel, Rochester, N. Y.

Application January 21, 1937, Serial No. 121,580

5 Claims. (Cl. 128—288)

This invention relates to garments made of liquid latex such as latex pants and the like, as well as to forms for making the same.

In the manufacture of baby pants provided with ruffles thereon, it has been the practice in the past to make such pants by cementing or stitching pieces of sheet rubber together to form the garment and to cement or stitch ruffles thereon. The resulting cemented or stitched seams are a source of frequent failure during use so that a garment of this type is of relative short life.

In accordance with the main feature of the present invention, there are provided seamless rubber pants deposited from liquid latex or the like and having ruffles integral therewith, the pants together with the ruffles being made of one piece of latex or rubber without seams of any kind therein. Such a construction permits the deposition of the pants from an aqueous dispersion of rubber, commonly known as latex, which possesses much greater inherent elasticity and longer life than cemented or stitched sheet rubber garments that have been available in the past.

A further feature of the invention relates to novel forms on which the seamless ruffled pants of deposited rubber, can be made.

These and other features of the invention will appear from the detailed description and claims when taken with the drawings in which Fig. 1 is a front view and Fig. 2 is a side view of a pair of rubber pants made in accordance with the present invention; Fig. 3 is a section thereof taken on the line 3—3 of Fig. 1 illustrating the construction of the waist portion of the pants; Fig. 4 is a section through the ruffle and the leg opening of the pants taken on the line 4—4 of Fig. 1; Fig. 5 is a fragmentary view of a somewhat modified pair of rubber pants in which the leg openings face slightly toward the front of the pants; Fig. 6 is a sectional view through the ruffle and adjacent body portion at a leg opening of these pants taken substantially on the line 6—6 of Fig. 5; Figs. 7 and 8 are sectional views taken through fragments of modified pants illustrating other types of ruffles; Fig. 9 is a front elevation and Fig. 10 is a side elevation of a form on which the rubber pants of Fig. 1 can be deposited; Figs. 11 and 12 are sections taken through this form respectively on the lines 11—11 and 12—12 and also illustrating thereon in section a layer of rubber comprising the pants; Fig. 13 is an enlarged section through the ruffle-generating portion of the form, taken on the line 13—13 of Fig. 10; Fig. 14 is a section of this last mentioned portion of the form taken on the line 14—14 of Fig. 9 at right angles to the section of Fig. 12; Fig. 15 is a fragmentary front elevation and Fig. 16 is a side elevation of a slightly modified type of form on which a pair of pants, having leg openings with ruffles as illustrated in Fig. 5, can be deposited; Fig. 17 is an enlarged section through this modified type of form taken on the line 17—17 of Fig. 15 and Fig. 18 is an enlarged section of this portion of the form taken along the line 18—18 of Fig. 17 at right angles to this last-mentioned section; Fig. 19 is a fragment of a modified type of form; Fig. 20 is an enlarged fragmentary section through this form with a rubber layer thereon, taken on the line 20—20 of Fig. 19 and illustrating the character of ruffle and the reinforcement of the margin thereof which can be generated on this form; Fig. 21 is a fragment of a further modified type of form on which a pair of pants similar to those illustrated in Figs. 6 and 7, can be deposited; Fig. 22 is an enlarged section of this form with a rubber layer thereon taken on the line 22—22 of Fig. 21; Figs. 23 and 24 are fragmentary sectional views of forms with rubber layers thereon, the forms being similar to that illustrated in Fig. 22 but disclosing other ways for depositing different styles of ruffles and marginal reinforcements therefor; Fig. 25 is a front view of a further modified type of pants and Fig. 26 is a section thereof taken on the line 26—26 of Fig. 25 illustrating the pants on a portion of the form on which it is deposited; Fig. 27 also is a front view of a still further modified type of pants; Fig. 28 is a fragmentary cross section of the waist portion thereof also illustrating a fragment of the form on which the pants are deposited.

Referring especially to Figs. 1, 2, 3 and 4, the numeral 5 generally designates a pair of pants such as is suitable for infant's wear. These pants which are made from seamless rubber preferably deposited from an aqueous dispersion of rubber or latex, include a front portion 6 and a rear portion 7. At the top of the pants there is provided a waist opening 8 and in each side of the pants near the top thereof there is provided a side opening 9 connected by a slit 10 with the waist opening. The margin of the pants at the waist opening has an integral reinforcing rubber ridge 11 of semi-pear-shaped cross section, as best illustrated in Fig. 3, while the margins of the pants at the side openings 9 and the slits 10 are likewise reinforced by an integral rubber ridge having an outwardly flaring feather edge.

In order to close the side openings, a buttonhole 12 is provided in the pants at each side of the slit 10 which buttonholes are adapted to receive buttons or other fastening means (not shown) to hold the adjacent flaps of the pants together. The pants at the margins of the buttonholes 12 are preferably reinforced by ridges of rubber. While the front part 6 and the rear part 7 of the pants may be of equal length, it is preferred to have the margins of these pants at the waist opening offset, the rear margin preferably extending beyond the front margin. The body of the pants, which has leg openings 13 formed therein (see Fig. 4) is provided with integral ruffles 14, each ruffle flaring outwardly from the body portion and enclosing a leg opening formed therein. The margin of each ruffle is reinforced, as shown at 15 in Fig. 4, which reinforcement is generally triangular in cross section but preferably terminates in a torn or feather edge 16. It should be especially noted that the junction between the body of the pants and the ruffle 14 is reinforced as indicated at 17 by a ridge of rubber formed integrally with the pants.

As shown especially in Figs. 2 and 4, the ruffles are parallel to the common plane of the body of the pants. However, in Figs. 5 and 6, a modified arrangement is shown in which the leg openings in the pants and the ruffles about the same, face slightly toward the front of the pants. There is also indicated a different type of reinforcement for the free edge of the ruffle, the reinforcement being a ridge 18 on one surface of the ruffle instead of the triangular reinforcement previously described.

It has been pointed out that the junctions between the body portion of the pants and the ruffles thereof at the leg openings, may be reinforced to engage the infant's legs snugly. However, in the pants shown in Fig. 7, the reinforcement 17 has been omitted and instead the junction between the ruffles and the body of the pants at the leg opening are merely of restricted diameter to afford a snug fit.

In Fig. 8, there is illustrated in a fragmentary sectional view, a ruffle arrangement similar to that disclosed in Fig. 4. The ruffle 14 of this arrangement has its free edge reinforced by a ridge 19 which is substantially semi-pear-shaped in cross section.

The pants shown in Figs. 1 to 4 can be made by depositing latex on a form 20 illustrated in Fig. 9. This form, which has the general outline of the desired pants, is provided at its upper portion with two ruffle-generating diverging extensions 21. The junction between the body of the form and each extension 21 defines an angular recess 24 in which the latex can accumulate as a reinforcement at the junction between the body of the pants and the ruffle thereon to insure that the garment at the leg opening, will snugly engage the leg of the infant. These extensions diverge from the body of the form and the lateral surfaces thereof curve outwardly from the body. A flange 22 which projects downwardly from the end portion of each extension, is provided with an abrupt edge 23 (see Figs. 13 and 14). The lower end of the form terminates in a continuous abrupt edge 25 defining the waist opening in the pants. As best shown in Fig. 10, this abrupt edge has offset portions located at the front and back of the form. On each lateral edge of the form there is provided a plate 26 of flattened elliptical outline to define a side opening or pocket opening in the pants.

Each of these plates has formed integral therewith, a narrow rib 27 which extends as far as the abrupt edge 25 of the form. By this construction, the waist opening and the side or pocket openings in the resulting garment communicate with each other. The form is also provided at each side of the rib 27 with a boss 28 to define buttonholes in the resulting garment. It should be noted that the plates 26, the ribs 27 and the bosses 28 terminate in abrupt edges best shown in Figs. 11 and 12.

The modified type of garment shown in Figs. 5 and 6 can be made on the form 20 illustrated in Figs. 15 to 18 inclusive. This form differs mainly from the type of form just described in that the principal axis of the ruffle-generating extensions 21, projects slightly toward the front of the form. Each extension is provided with a reinforcement-generating groove 31 adjacent the abrupt edge 32 thereof.

In making pants on the foregoing forms, a coating of latex such as an aqueous dispersion of rubber is deposited in any of the several known commercial ways on the surface of the form until a layer of the desired thickness results. In the junction 24 between the form proper and the extension 21, the latex will accumulate as a thickened reinforcement 17 in the layer while in the recess 31 adjacent the abrupt edge 32, the reinforcement 18 will be deposited. However, at the abrupt edge 32 there will be a line of weakness in the deposited coating. Above the abrupt edge 25 on the lower portion of the form, the latex will accumulate as a reinforcement 11 (see Fig. 3), while in the junctions of the plates 26 the ribs 27 and the bosses 28 with the form, the latex will accumulate as best shown in Figs. 11 and 12. However, at the abrupt edges of these parts there will be a line of weakness in the coating. When the latex is properly "set", the excess portions of the layer (not shown) on the upper ends of the extensions 21 are torn or cut away as far as the abrupt edges 32, leaving the ruffles 14 with reinforced margins 18. The excess portion of the layer on the faces of the plates 26, the ribs 27 and the bosses 28 is stripped, torn or cut away leaving the margins of these portions of the pants with reinforced edges. The excess portion of the layer (not shown) on the lower end of the form is also likewise removed as far as the abrupt edge 25.

The type of pants disclosed in Fig. 8 can be made on the modified form shown in Figs. 19 and 20, wherein the ruffle-generating extensions 21 are each of mushroom shape and terminate in sharp edges 35. The neck of the extension 21 is reduced in thickness as compared with the thickness of the body of the form 20 so that the junction between these parts, provides a recess 24 in which the latex will accumulate as a highly important reinforcing ridge 17 in the rubber layer at the leg opening.

In making a pair of pants on this last-mentioned form, latex is deposited thereon until a layer of desired thickness is developed on the form. The latex will accumulate in each recess 24 to develop a ridge, while above the sharp edge 25 of each extension, the latex will accumulate as a ridge 19 which is substantially semi-pear-shaped or semi-oval in cross section. At the sharp edge itself the layer will have a line of weakness developed therein so that the portion of the layer (not shown) on the upper end of the extension can readily be removed as far as this mentioned line of weakness leaving the ruffle with a reinforced edge 19. The remaining operations of completing the pants need not be set forth, since they may be identical with the operations already described.

The modified type of form shown in Figs. 21 and 22 may be employed in the making of pants such as illustrated in Fig. 7. It will be noted in this form that each ruffle-generating extension 21 merges into the surface of the body of the form, so that there is no reinforcement generating recess at the junction between these parts. However, it will be especially noted that the opening through the ruffle is of reduced diameter as compared to the adjacent body portion of the pants so that the resulting pants will snugly fit the legs of the infant. The curved surface of each extension 21 is provided with a groove 39 which completely encircles the extension near the abrupt edge 40 thereof. The upper end of each extension may have a flat surface 41 which is surrounded by a lateral rim 42 terminating at the abrupt edge 40.

In making a pair of pants on this form, latex is deposited thereon until a layer of the desired thickness is developed on the form. The latex will accumulate in the groove 39 as a reinforcing ridge, while at each abrupt edge 40 of the form a line of weakness will develop in the latex layer. The excess portion of the latex layer (not shown) on the upper ends 41 and sides 42 of the extensions can be separated from the remainder of the layer at the abrupt edges 40. The remaining operations of making a garment on this form will be obvious from the description previously given.

In Fig. 23 there is indicated a modified type of form on which pants with a bell-shaped style of ruffle can be generated. In this type of form, each extension 21 is joined to the body proper of the form to provide a recess 24. The free end of each extension 21 is made with a projecting plate 45 having an abrupt edge 46, the projecting margin of the plate providing a recess 47 on the extension.

When a latex layer is deposited on this form, the latex will accumulate in the recess 47 while at the abrupt edge 48 there will be a line of weakness in the layer. Also the latex will accumulate in the junction between the ruffle and the body of the pants at the leg opening. In finishing these pants, after the latex has "set," the excess portions of the layer on the top and sides of the plates 45 is stripped, cut or torn away at the lines of weakness developed at the abrupt edges 46. The remaining operations of completing the pants will be similar to those already set forth and need not be repeated.

The modified form shown in Fig. 24 is suitable for making pants with ruffles which, instead of flaring outwardly, are directed inwardly so that the free edge of the ruffle can also snugly engage the leg of the infant. In order to provide a reinforcement at the free edge of each ruffle, the end of each extension 21 of the form is provided with a raised panel 50 having an abrupt edge 51 which panel projects abruptly from the extension proper to afford a recess 52.

When this last-mentioned form is coated with latex, the layer acumulates in this recess 52 to provide a ridge having a triangular cross section. It will be understood that during the depositing operation, the latex will tend to flow away from this abrupt edge 51 leaving a line of weakness in the layer. In the finishing of a pair of pants deposited on this form, the excess portions of the layer on the faces of the panels 50 are stripped, cut or torn away as far as the abrupt edges 51 thereof, leaving a thin edge 53 on the triangular reinforcement 52.

In Figs. 25 and 26, there is illustrated a modified type of pants 5a having a front portion 6a and a rear portion 7a. The waist opening 8a in these pants, is surrounded by a' ruffle 8b which projects outwardly from its junction with the main portion of the pants. This junction which is reinforced by an integral accumulation of rubber 8c, is preferably restricted in diameter as compared with the waist portion of the pants so that it snugly fits the waist of the infant. These pants have abbreviated legs 14a with a crotch portion therebetween, the free edges of these legs being preferably reinforced by integral ridges of rubber of the character shown in Figs. 4, 6 and 8. Ventilating openings O are provided in the front of the pants as indicated in Fig. 25.

The pants shown in Fig. 25 may be deposited on a form 55, a portion of which with a layer of rubber thereon is illustrated in cross section in Fig. 26. This form is preferably dipped into a latex bath, as already described, in the position illustrated.

The modified pants 5b illustrated in Figs. 27 and 28 are similar to the pants just described except that the free margin of the ruffle 8b' at the waist opening is reinforced by an integral ridge 8c of rubber herein illustrated as being semi-pear-shaped or semi-oval in cross section. These last mentioned pants do not have abbreviated legs but instead have reentrant leg openings 13b in the body thereof. The margin of the material adjacent each of the leg openings is preferably reinforced by an integral ridge of rubber (not shown).

The pants illustrated in Fig. 27 likewise can be made on a suitable form 56 of which a fragment thereof coated with a layer of rubber, is illustrated in cross section in Fig. 28. This last-mentioned form is preferably dipped into a latex bath in inverted position with respect to that in which it is illustrated in Fig. 28. When thus dipped the reinforcing ridge 8e will accumulate above the abrupt bottom edge 57 of the form and the reinforcement at the junction 8c' between the ruffle of the body of the pants will accumulate in the recess 58 of the form.

It will be understood that the ruffle-like or cuff-like portion at the leg openings as well as at the waist opening of the garment afford a relatively wide contacting surface with the body of the wearer as distinguished from substantially a line contact as was present in former baby pants. This result is achieved without shirring or gathers so that a smooth and comfortable surface is in contact with the wearer. In addition the relatively wide contacting surface afforded by the ruffle-like or cuff-like portion provides a more adequate seal against the passage of liquid past the mentioned portion.

The foregoing disclosure is given merely by way of example, and it will be understood that there may be many modifications and variations of the same within the scope of the appended claims without departing from the spirit of the present invention.

What I claim is:

1. A hollow seamless deposited rubber article having a body portion with a limb-receiving opening therein and a limb-encircling band portion surrounding said opening integral with said body portion, said band portion extending outwardly from the body portion, said body portion and said band portion in the region thereof adjacent said opening being free from shirring or gathers, the junction of said body portion and band portion being adapted to snugly engage the limb of the wearer and having a substantial surface contact therewith, without substantial constricting action.

2. A hollow, seamless deposited rubber article having a body portion with a limb-receiving opening therein and a limb-encircling cuff-like portion surrounding said opening, integral with said body portion, said cuff-like portion flaring outwardly from the body portion to a margin of greater perimeter than that of said opening, the body portion and cuff-like portion in the region adjacent said opening being free from shirring or gathers, the junction of said body portion and said cuff-like portion being adapted to snugly engage the limb of the wearer with a substantial surface contact and without substantial constrictive action.

3. A pair of seamless, deposited rubber pants having a waist-opening and leg-openings therein, said leg openings being of a size adapted to snugly receive the legs of the wearer, the body of said pants being provided with outwardly flaring portions integral therewith at said leg openings, the junction of each portion with said body being curved transversely of the junction to afford surface engagement with the leg of the wearer, said portions being free from gathers.

4. A pair of seamless, deposited rubber pants having a waist opening and leg openings therein, said leg openings being of such size as to engage the leg of the wearer, the body of said pants being provided with ruffle-like portions integral therewith at said leg openings, each of said portions flaring outwardly from the body of said pants and then inwardly to define a second opening of such size that said inwardly flaring part of said portion may engage the leg of the wearer whereby a double seal is provided at said leg opening.

5. A pair of seamless, deposited rubber pants having a waist opening and leg openings therein, said leg openings being of such size as to engage the leg of the wearer, the body of said pants being provided with ruffle-like portions integral therewith at said leg openings, each of said portions flaring outwardly from the body of said pants and then inwardly to define a second opening of such size that said inwardly flaring part of said portion may engage the leg of the wearer whereby a double seal is provided at said leg opening, the material of said pants adjacent at least one of the openings at said ruffle-like portions being strengthened by an accumulation of rubber integral therewith.

ABRAHAM N. SPÁNEL.